UNITED STATES PATENT OFFICE.

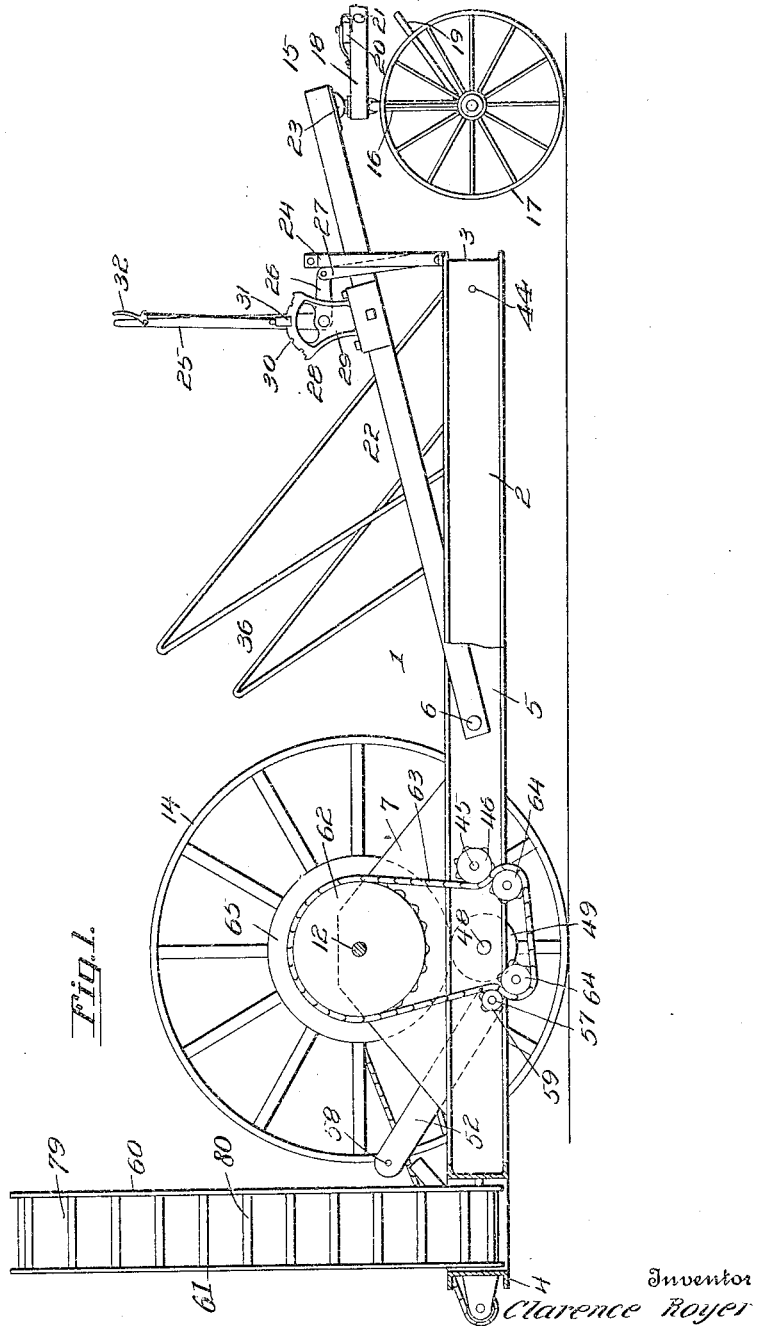

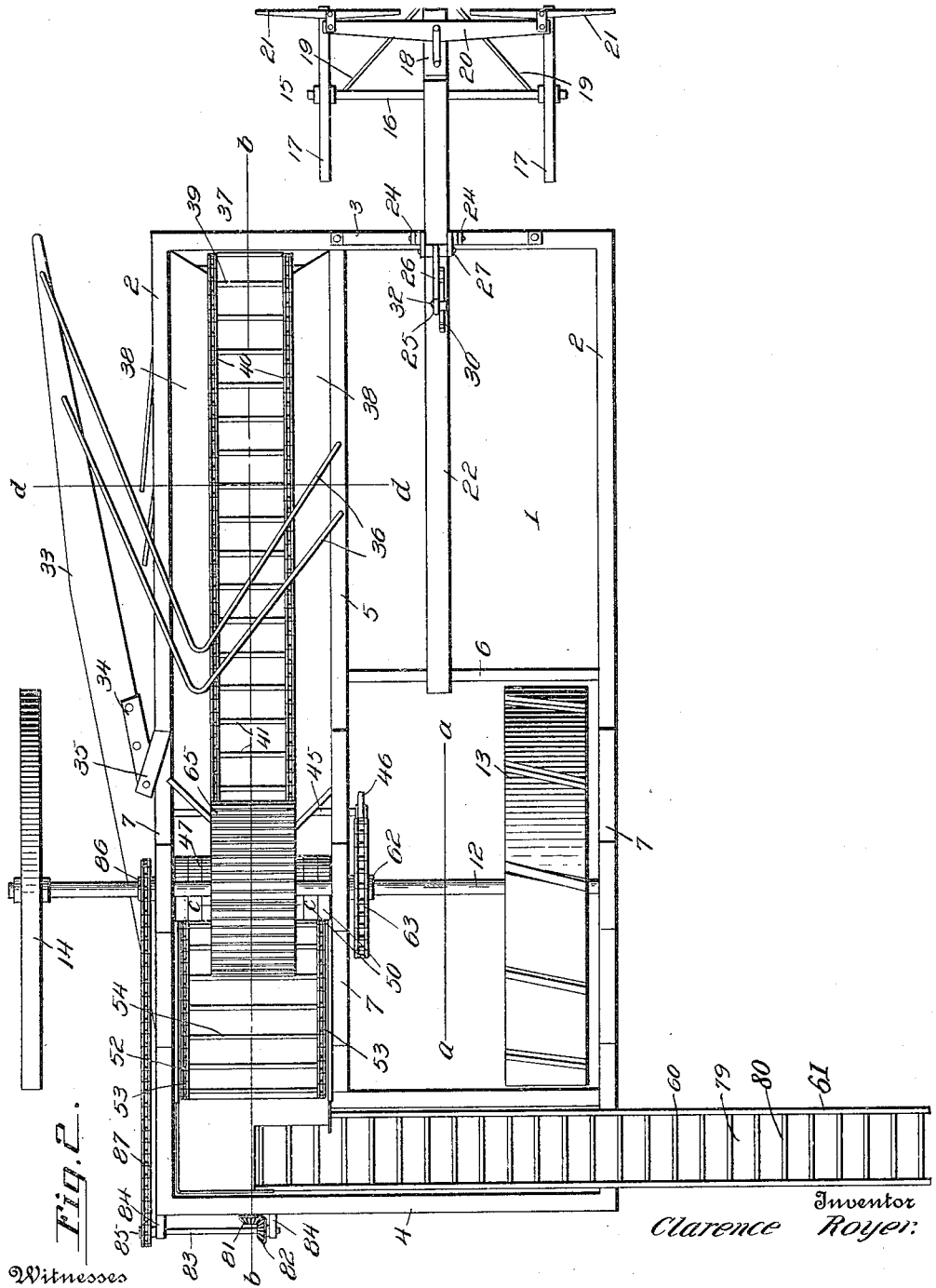

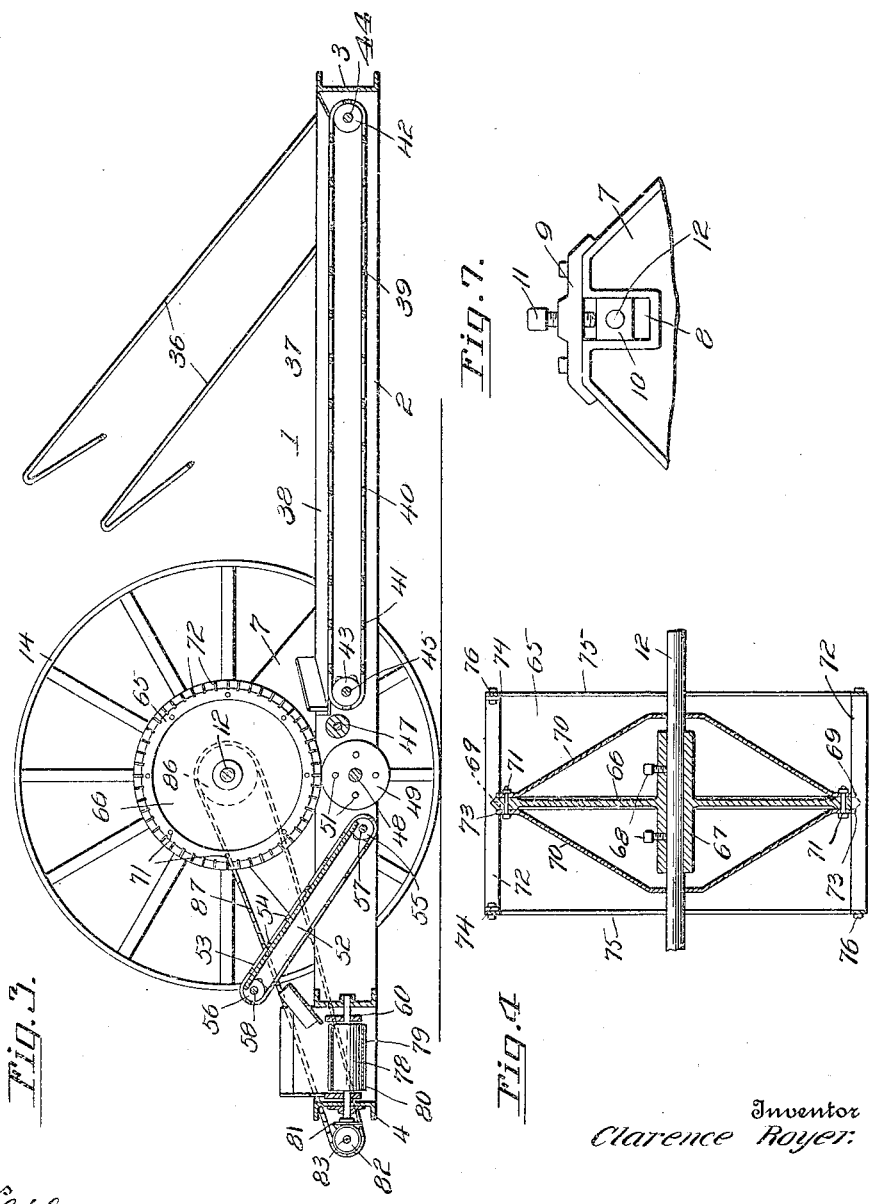

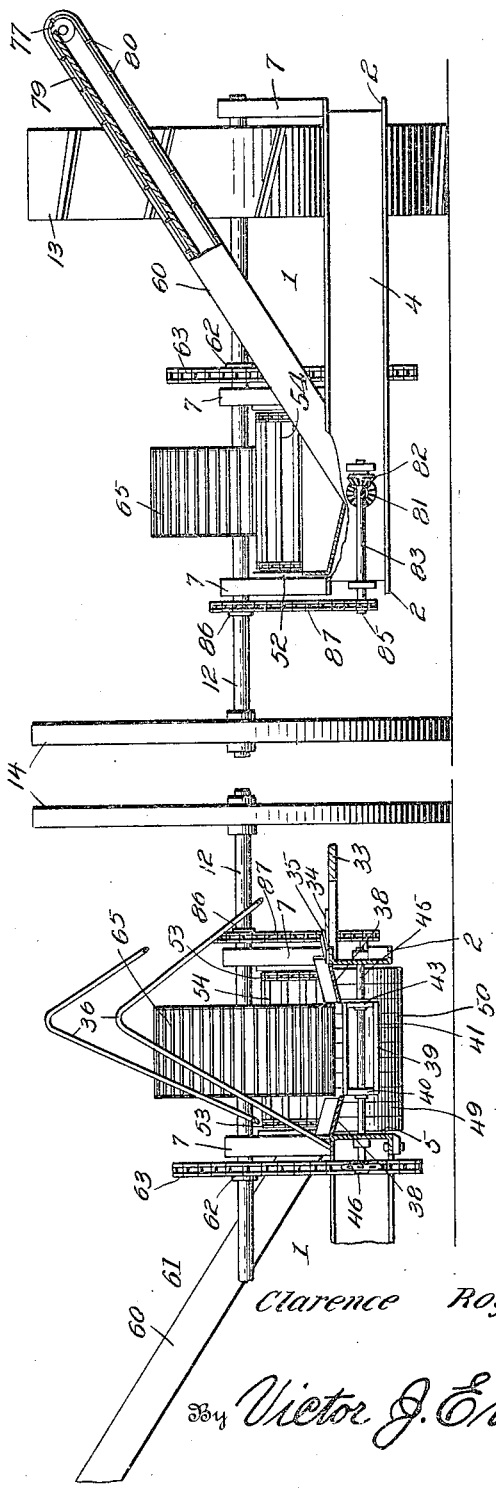

CLARENCE ROYER, OF NEWTON, KANSAS.

CORN-CUTTING MACHINE.

1,137,667.  Specification of Letters Patent.  Patented Apr. 27, 1915.

Application filed February 27, 1914. Serial No. 821,501.

*To all whom it may concern:*

Be it known that I, CLARENCE ROYER, a citizen of the United States, residing at Newton, in the county of Harvey and State of Kansas, have invented new and useful Improvements in Corn-Cutting Machines, of which the following is a specification.

This invention is an improved corn cutting machine for cutting standing corn and converting the same into ensilage by cutting the stalks into short lengths after they have been cut in the rows, the object of the invention being to provide an improved machine of this character which cuts standing corn and converts the same into ensilage in the field ready to be hauled to the silo and which is extremely cheap and simple, is very strong and durable, which is directly geared so that no parts of the machine are required to move rapidly, and which is readily kept in order and is of comparatively light draft.

One specific object of the invention is to provide improved means for cutting standing corn.

Another specific object is to provide improved means for cutting the corn into short lengths and converting it into ensilage immediately after it has been cut in the rows.

Another object is to simplify the construction of the machine so that the ensilage cutter is driven directly by the axle shaft.

Another specific object of the invention is to effect improvements in the construction of the ensilage cutter.

The invention consists in the construction, combination and arrangement of devices hereinafter described and claimed.

In the accompanying drawings:—Figure 1 is a side elevation of a corn cutting machine constructed in accordance with my invention, partly in section on the plane indicated by the line *a—a* of Fig. 2. Fig. 2 is a plan of the same. Fig. 3 is a detail vertical longitudinal sectional view on the plane indicated by the line *b—b* of Fig. 2. Fig. 4 is a detail vertical transverse sectional view on the plane indicated by the line *c—c* of Fig. 2. Fig. 5 is a detail vertical transverse sectional view on the plane indicated by the line *d—d* of Fig. 2. Fig. 6 is a detail rear elevation, partly in section, showing the construction of the endless elevator and the gears for operating the same. Fig. 7 is a detail elevation of one of the bearings of the axle shaft.

In the embodiment of my invention I provide a main frame 1 which is of oblong rectangular form comprising a pair of side bars 2, a front cross bar 3, a rear cross bar 4 and an intermediate longitudinal bar 5 which is spaced a suitable distance from the left hand side of the frame. A cross bar 6 is also provided which connects the right hand side of the frame with the intermediate bar 5.

Pillow blocks or standards 7 are secured on the bars 2 and on the intermediate bar 5, a suitable distance from the rear end of the frame and each of these pillow blocks is provided in its upper side at its center with a vertical slot 8. Cap irons 9 are bolted on the upper sides of the pillow blocks and extend across the upper ends of the said slots 8. Bearing blocks 10 are arranged in said slots and are held in place therein and are adapted to be vertically adjusted therein by means of screws 11 which engage threaded openings in the cap irons and the lower ends of which are swivelly connected or otherwise suitably connected to the bearing blocks. The axle shaft 12 has its bearings in the said bearing blocks and is provided at its right hand end with a driving and supporting wheel 13, which has a broad tread, the axle shaft being also provided at its left hand end with a supporting wheel 14 of the same diameter as the wheel 13 but having a narrower tread. The wheel 14 is spaced from the left hand side of the frame. The driving wheel 13 is within the frame and is arranged near the right hand side thereof.

A front truck 15 is provided which comprises an arched axle 16, a pair of comparatively small wheels 17 on the spindles of the axle and a draft tongue or pole 18, which has its rear end secured to the arch of the axle and which is also provided with braces 19. This pole or tongue is equipped with the usual doubletree 20 and swingletrees 21. A draft bar 22 has its rear end pivotally connected to the cross bar 6 and thereby pivotally connected to the main frame. The front end of this draft bar has a pivotal connection 23 with the rear end of the tongue or pole. At the front end of the main frame is a vertical guide 24 in which the draft bar operates and said draft bar is provided with an adjusting lever 25 which has a crank arm 26 connected by a link 27 to the front end of the main frame. The said lever is pivotally mounted as at 28 on a standard bracket 29 which is bolted or otherwise suitably secured on the upper side of the draft bar and is provided with a segment rack 30 which may be engaged by a dog 31, to lock the lever in any desired adjusted position, the dog being slidably mounted on the lever and the latter being provided with a finger piece 32 for engaging and disengaging the dog. It will be understood that by turning the lever its crank arm and link may be caused to raise or lower the front end of the frame.

On the left hand side of the main frame is a guide arm 33 the front end of which is spaced from the said frame and the rear end of which is secured to the left hand side bar 2 of said frame, the said guide arm being arranged obliquely to the left hand side of the main frame and converging rearwardly thereto. On the upper side of this guide bar, at the point where it joins the main frame is a cutter knife 34 which is adapted to exert a shear cut on the standing corn stalks caught between said guide arm and the left hand side of the main frame, and a cutter plate 35 which is secured to and projects from the left hand side of the main frame at an angle to and which overlaps the rear end of said cutter knife.

Inverted V-shaped gathering arches 36 are arranged astride the left hand side of the main frame, each of said arches having the lower end of one of its arms attached to the intermediate bar 5 and the lower end of its outer arm attached to the guide arm 33. These gathering arches are inclined rearwardly and also arranged obliquely and diminish in height rearwardly, the front gathering arch being higher than the rear gathering arch and said gathering arches serve to engage the standing corn stalks and bend them forwardly and also direct them inwardly over the left hand side of the main frame as the machine advances parallel with a corn row, so that as the stalks are severed by the cutters 34—35 the said gathering arches cause them to drop butts to the rear, into a longitudinally arranged trough 37 which is between the left hand side bar 2 and the intermediate bar 5. This trough has inclined downwardly converging sides 38 and the bottom of said trough is formed by an endless feed carrier 39 which comprises a pair of endless sprocket chains 40 and a series of flights 41 which connect said chains. The chains of the said feed carrier engage sprocket wheels 42—43 which are respectively on shafts 44—45 which have their bearings in the sides of said trough 37 and the said shaft 45 is also provided, at its inner end, with a sprocket wheel 46.

Spaced a slight distance in rear of the said feed carrier is a fender roller 47 the shaft of which has its bearings in the left hand bar 2 and intermediate bar 5 and said bars also have bearings for the shaft 48 of a revoluble ledger roller 49. This ledger roller is in practice composed of a series of circular hard wood blocks 50 which are secured together by bolts 51.

In rear of the ledger roller is an inclined longitudinally arranged endless delivery carrier 52 which is wider than the feed carrier and fills the space between the rear portions of the left hand side bar 2 and intermediate bar 5. This delivery carrier comprises a pair of endless sprocket chains 53 and a series of flights 54 which connect said chains together, the said flights being more closely spaced than those of the feed carrier. These chains 53 engage sprocket wheels 55—56 which are respectively on shafts 57—58. Said shaft 57 is provided at its inner end with a sprocket wheel 59. Said shaft 57 has its bearings in the left hand side bar 2 and intermediate bar 5 and the shaft 58, which is somewhat elevated, is mounted in bearings near the rear end of the inclined frame 52 of said delivery carrier.

A master sprocket wheel 62 is secured on the axle shaft 12 for rotation therewith and is connected by an endless sprocket chain 63 with the driving sprocket wheels 46 and 59 of said feed and delivery carriers, said sprocket chain being kept in engagement with said sprocket wheels by means of direction rollers 64. Hence when the machine is drawn forwardly the feed carrier and the delivery carrier are operated so that their upper leads are caused to move rearwardly as will be understood.

An ensilage cutting cylinder 65 is secured directly on the axle shaft 12 for rotation therewith and coacts with the ledger roller to cut the corn stalks fed by the feed carrier into short lengths and deliver them as ensilage on to the delivery carrier to be conveyed thereby to the elevator 61. I will now describe the construction of the ensilage cutting cylinder. A circular web 66 is provided with a tubular hub element 67 through which the axle shaft 12 passes, the said web being in the center of said hub element and the latter being provided with set screws 68 to secure the hub element on the axle shaft for rotation therewith. In the periphery of the web 66 are spaced slots 69 which are open at their outer ends. On opposite sides of the web are a pair of reversely arranged substantially conical disks 70 which have their hollow sides opposed. These disks are secured near their peripheries on opposite sides of the web by means of bolts 71. A series of transversely radially arranged knives 72 have their central portions engaged, at their backs, in the slots 69 of the web and are also provided in their backs with notches 73 into which the peripheral edges of the disks 70 extend, said disks thereby preventing longitudinal movement of said knives. The cutting edges of the knives at their outer sides and the ends of the knives are provided with laterally extending arms 74 which are secured to the inner sides of a pair of side rings or bands 75 by means of bolts 76. Said rings or bands support the ends of knives and connect them and also arrange them concentrically with respect to the axle shaft.

As the machine advances the cutting cylinder is rotated directly by the axle shaft 12 so that the corn stalks which are fed by the carrier 39 are caught between said cutting cylinder and the ledger roller and cut by the knives 72 into short lengths and hence are converted into ensilage. The ends of the cutting cylinder are open as will be observed upon reference to Fig. 4 and peripheral spaces are formed in the cutting cylinder between the knives. Hence the ensilage passes inwardly through the periphery of the cylinder at the lower side of and outwardly from the ends of the cylinder, being deflected by the outwardly dished disks 70 and drops from the ends of the cutting cylinder, at the rear side, on to the delivery carrier, the latter conveying the same to the elevator 61 which delivers the ensilage into the bed of a wagon driven alongside of the machine.

The elevator 61 comprises an upper roller 77, a lower roller 78, and an endless web or apron 79 having flights 80. At one end of the shaft of the lower roller 78 is a miter gear 81 which is engaged by a similar gear 82 on a shaft 83. This shaft is arranged transversely and at the rear end of the main frame and mounted in bearing brackets 84 and is provided at its outer end with a sprocket wheel 85. The axle shaft 12 has a sprocket wheel 86 which is connected by an endless sprocket chain 87 with the sprocket wheel 85 hence power is communicated to the said endless elevator.

While I have herein shown and described a preferred form of my invention I would have it understood that changes may be made in the form, proportion and construction of the several parts without departing from the spirit of the invention and within the scope of the appended claims.

Having thus described my invention, I claim:—

1. In a machine of the class described a main frame, standing corn stalk cutting means, an axle shaft for the main frame, driving and supporting wheels on said shaft, an ensilage cutting cylinder on and revolved by said shaft, a ledger roller mounted in the frame and arranged below the cutting cylinder, and means to feed the cut stalks to said cutting cylinder and ledger roller.

2. In a machine of the class described a main frame, standing corn stalk cutting means, an axle shaft for the main frame, driving and supporting wheels on said shaft, an ensilage cutting cylinder on and revolved by said shaft, a ledger roller mounted in the frame and arranged below the cutting cylinder, means to feed the cut stalks to said cutting cylinder and ledger roller and means to vertically adjust the axle shaft and thereby adjust the cutting cylinder with respect to the ledger roller.

3. In a machine of the class described a main frame, standing corn stalk cutting means carried by the said frame, a feed carrier, means to arrange the cut stalks on said carrier, an axle shaft for the said frame, driving and supporting wheels on said shaft, an ensilage cutting cylinder on and revolved by said shaft, and to which the cut stalks are fed by the carrier and a ledger roller mounted in the said frame and arranged below the cutting cylinder.

4. In a machine of the class described a main frame, standing corn stalk cutting means carried by the main frame, a feed carrier, means to arrange the cut stalks on said carrier, an axle shaft for the said frame, driving and supporting wheels on said shaft, an ensilage cutting cylinder on and revolved by said shaft and to which the cut stalks are fed by the carrier and a ledger roller mounted in the said frame and arranged below the cutting cylinder, said cutting cylinder having peripheral, spaced knives and being open at its ends to permit the passage of ensilage inwardly through one side of the cylinder and outwardly therefrom at its open ends.

5. In a machine of the class described a main frame, standing corn stalk cutting means carried by the main frame, a feed carrier, means to arrange the cut stalks on said carrier, an axle shaft for the said frame, driving and supporting wheels on said shaft, an ensilage cutting cylinder on and revolved by said shaft and to which the cut stalks are fed by the carrier and a ledger roller mounted in the said frame and arranged below the cutting cylinder, said cutting cylinder having peripheral, spaced knives and being open at its ends to permit the passage of ensilage inwardly through one side of the cylinder and outwardly therefrom at its open ends, and a delivery carrier below said cutting cylinder and in rear of the ledger roller and on to which the cutting cylinder discharges.

6. In a machine of the class described a main frame, standing corn stalk cutting means carried by the main frame, a feed carrier, means to arrange the cut stalks on said carrier, an axle shaft for the said frame, driving and supporting wheels on said shaft, an ensilage cutting cylinder on and revolved by said shaft and to which the cut stalks are fed by the carrier and a ledger roller mounted in the said frame and arranged below the cutting cylinder, said cutting cylinder having peripheral, spaced knives and being open at its ends to permit the passage of ensilage inwardly through one side of the cylinder and outwardly therethrough at its open ends, and a delivery carrier below said cutting cylinder and in rear of the ledger roller and on to which the cutting cylinder discharges, and driving means for the feed and delivery carriers and including a master element on and revolved by the said axle shaft.

In testimony whereof I affix my signature in presence of two witnesses.

CLARENCE ROYER.

Witnesses:
REUBEN ROYER, Sr.,
J. G. REGIER.

Copies of this patent may be obtained for five cents each, by addressing the "Commissioner of Patents Washington, D. C."